Jan. 19, 1954   R. H. GRIFFIN   2,666,317
HIDE TREATING APPARATUS
Filed Aug. 5, 1948   5 Sheets-Sheet 1

FIG. 1

Inventor:
Robert H. Griffin
By  Wilmer Mechlin
his Attorney

Inventor:
Robert H. Griffin
By Wilmer Mechlin
his Attorney

Jan. 19, 1954

R. H. GRIFFIN 2,666,317

HIDE TREATING APPARATUS

Filed Aug. 5, 1948

Inventor:
Robert H. Griffin
By Wilmer Mecklin
his Attorney

Jan. 19, 1954     R. H. GRIFFIN     2,666,317
HIDE TREATING APPARATUS Filed Aug. 5, 1948     5 Sheets-Sheet 4

Inventor:
Robert H. Griffin
By Wilmer Mechlin
his Attorney

Patented Jan. 19, 1954

2,666,317

UNITED STATES PATENT OFFICE 2,666,317

HIDE TREATING APPARATUS

Robert H. Griffin, Crestwood, Yonkers, N. Y., assignor to Tanners' Research Corporation, New York, N. Y., a corporation of Delaware Application August 5, 1948, Serial No. 42,652

35 Claims. (Cl. 69—41)

This invention relates generally to the treatment of sheet material and particularly to apparatus for treating one or both surfaces of sheet material as a continuous process, the apparatus being described for purposes of illustration in its application to the treatment of hides.

An object of the present invention is to provide an improved apparatus for treating sheet material as a continuous process.

Another object of the invention is to provide an improved hide treating apparatus having means for removing undesired material from both surfaces of the hide in a single pass.

Another object of the invention is to provide an improved hide treating apparatus having a movable work support and means, actuated by the hide, cyclically operating treating means in timed relation to the travel of the hide.

A further object of the invention is to provide an improved hide treating apparatus in which suction is employed for gripping a hide to successive work supports, having positive means for transferring a hide from one to the next of said supports.

A further object of the invention is to provide in an improved hide treating apparatus a cyclic control actuated by a hide for causing treating means to act upon a hide in timed relation to its travel.

Other objects and advantages of the invention will appear hereinafter in the detailed description, be particularly pointed out in the appended claims, and illustrated in the accompanying drawings, in which:

Referring now in detail to the drawings in which like reference characters designate like parts, the apparatus herein disclosed is an improvement on the apparatus of my co-pending application, S. N. 703,571, filed October 16, 1946. As in the case of the apparatus of that application, the apparatus of the present invention, while applicable in general to the treatment of sheet material, has been illustrated applied to the treatment of hides and particularly to the performance thereon of the so-called "beamhouse" operations of unhairing, scudding, fleshing and cheeking. For brevity, the term "hides" is hereafter used generically to include skins and pelts, as well as other material in individual sheet form, the term applying to such other material except where used in connection with the "beamhouse" operations peculiar to tanning.

The apparatus of the present invention, the illustrated embodiment of which will hereinafter be termed hide treating apparatus and described particularly with relation to the treatment of hides, comprises a frame 1 on which the several parts of the apparatus are mounted. This frame preferably is formed of spaced uprights 2 connected by tubular or other suitable cross-braces 3, and, like the frame of my aforementioned application, may be formed of separable upper and lower sections to enable the apparatus to be readily disassembled.

While other forms are possible, the apparatus of the present invention contemplates the use of one or more movable members or work supports by which a hide or other work is moved or carried along a given path of travel and therealong presented or introduced to treatment. For performing as a continuous process the beamhouse operations for which the illustrated embodiment of the invention is particularly designed, two movable work supports are employed. These supports are preferably in the form of hollow drums or cylinders rotatably mounted on the frame 1 and arranged to receive and support a hide in sequence. For compactness the drums may be arranged vertically or in superposed relation, thus providing an upper drum 4 and a lower drum 5. While neither the order of the drums nor the particular treatments performed on each of them is critical, the illustrated apparatus contemplates introduction or infeeding of a hide first to the upper drum 4 whereon it is unhaired and scudded and subsequent transfer of the hide to the lower drum for fleshing and cheeking of its flesh face or side. Since sequential support of a hide is intended, accompanied by reversal of the face exposed, the work-supporting drums 4 and 5 are rotated in opposite directions and are mounted with their axes parallel and their peripheries contiguous or adjacent, sufficient spacing being provided between the drums for the passage of hides.

Figure 1:
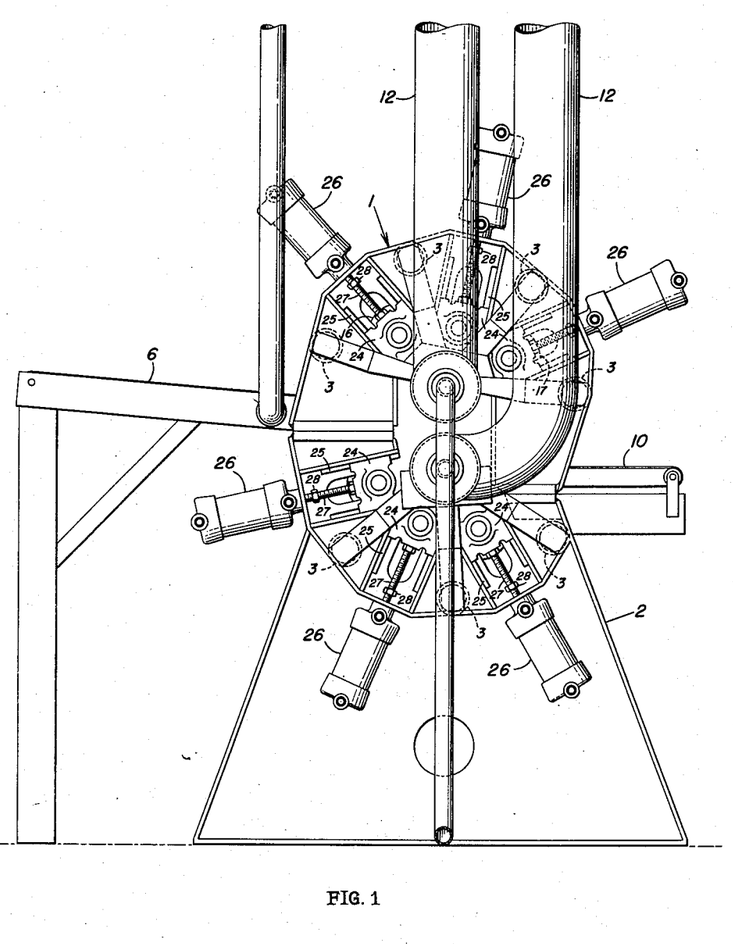
Figure 1 is a side elevational view of a preferred embodiment of the invention.
Figure 2:
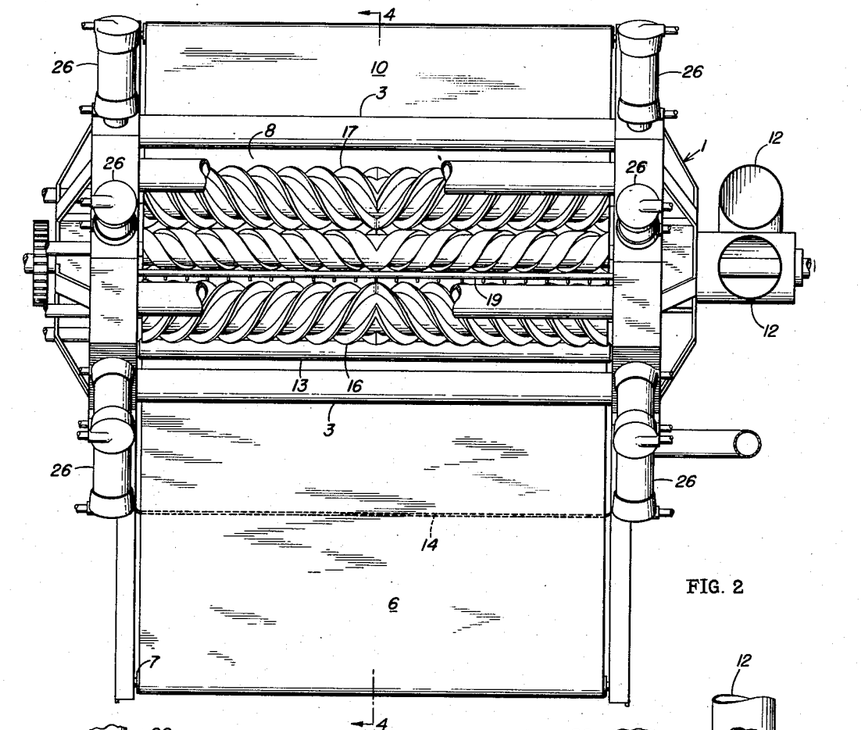
Figure 2 is a plan view of the apparatus of Figure 1.
Figure 3:
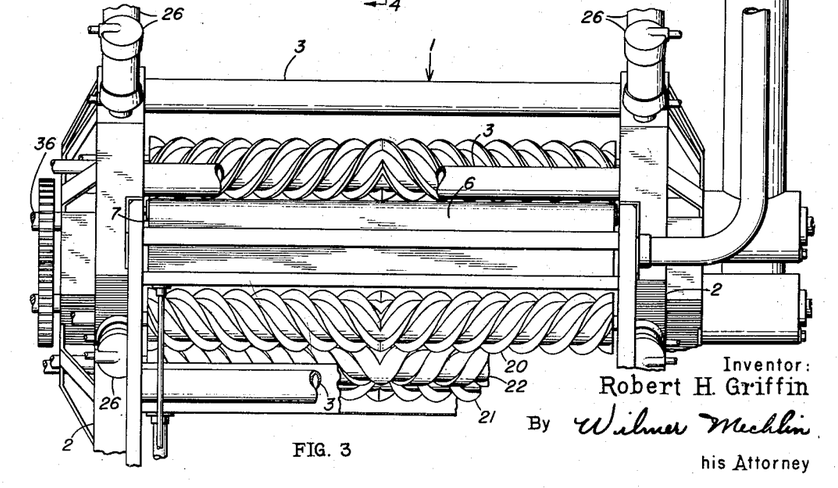
Figure 3 is a front elevational view of the apparatus with portions broken away to more clearly illustrate the details of construction.
Figures 4, 5, 6, 7, 16:
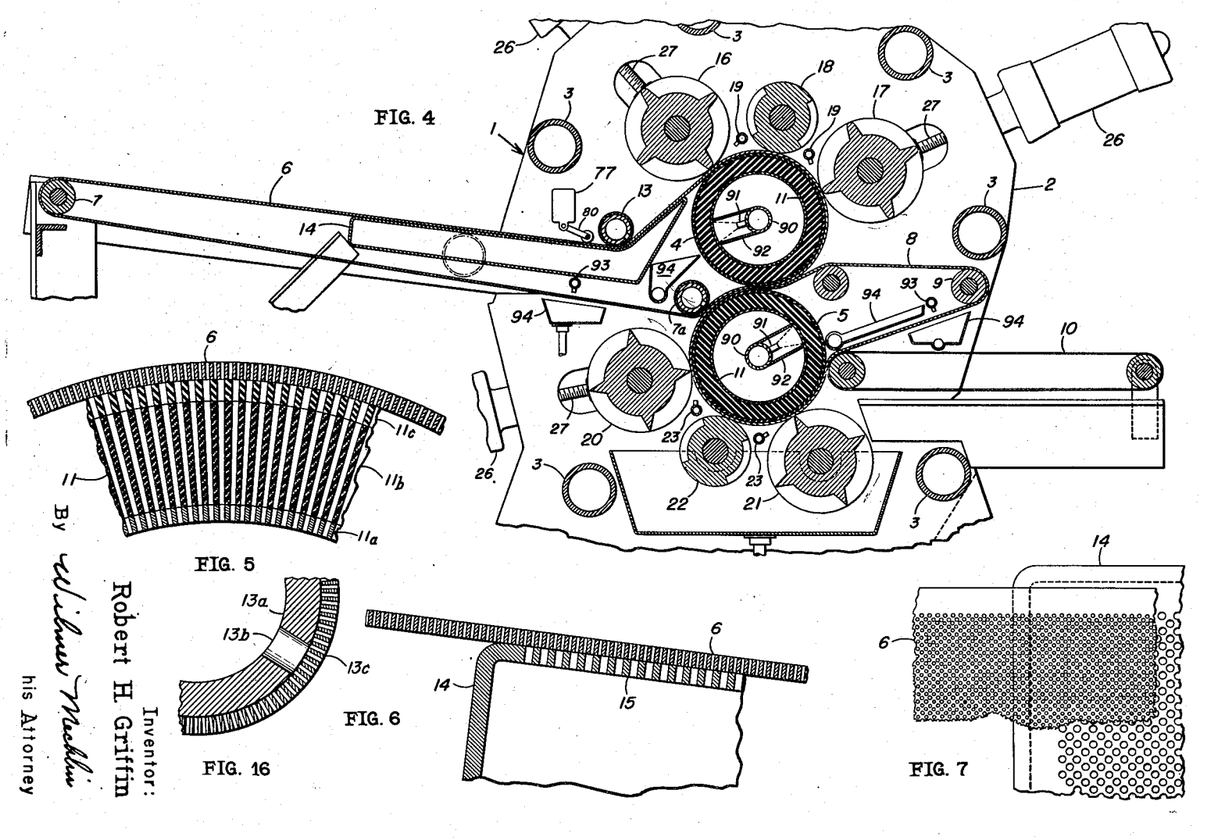
Figure 4 is a vertical sectional view on an enlarged scale taken along the lines 4—4 of Figure 3, with portions removed to more clearly illustrate the inter-relation between the work-supporting drums, conveyors and treating devices.
Figure 5 is a fragmentary sectional view on an enlarged scale showing the preferred perforate construction of the conveyors and work-supporting walls of the drums of Figure 4.
Figure 6 is a fragmentary sectional view on an enlarged scale showing a portion of the infeed conveyor and the associated portion of the vacuum box.
Figure 7 is a plan view of the portion of the conveyor and vacuum box shown in Figure 6.
Figure 16 is an enlarged fragmentary view of a preferred form of the guide rollers 7a and 13, the view being taken on a section normal to the axis of the roller.

For introducing or infeeding work to the first, upper or unhairing and scudding drum 4 there is provided a feed or infeed conveyor 6 in the form of a continuous or endless belt or band supported, carried, or runing over a pulley or roller 7 at one or the outer extremity, the roller being suitably journaled in an extension of the frame 1. At its inner extremity the belt passes over, encircles or is carried by the upper drum 4. A like belt or band 8 is provided for the lower, second or fleshing and cheeking drum 5, this belt also encircling, running over or being supported by the drum on one side and by a roller or pulley 9 at its outer extremity, the latter being suitably journaled in the frame. Adjacent the lower drum 5 and positioned to receive a hide therefrom is an outlet or discharge conveyor 10 which may also be in the form of an endless belt or band supported on suitably journaled rollers at its extremities. To facilitate understanding of the invention, the directions of rotation of the several rotatable members of the apparatus will be specified throughout the specification relative to the right side of the apparatus from which the views of Figures 1 and 4 are taken. So specified, the infeed conveyor 6 and the upper drum 4 rotate clockwise, the intermediate belt 8 and the lower drum 5 rotate counterclockwise, and the outlet conveyor 10 rotates clockwise.

In lieu of the mechanical gripping devices heretofore generally employed, the force required for gripping the hides to the drums is obtained through suction. Consequently, each of the drums is provided with a perforate work-carrying wall 11 on the outer surface or periphery of which suction is exerted through the application of a partial vacuum or sub-atmospheric pressure to the interior of the drum. This may be accomplished by connecting the hollow interiors of the two drums to a vacuum pump, not shown, through suitable conduits 12. Since in the apparatus of the present invention a hide directly engages one of the drum-encircling belts or bands 6 and 8 and is separated thereby from the surfaces of the drums, these two belts must also be perforate, foraminous or porous to permit the application of suction therethrough. Employing the belts and drums of this character, a hide placed on the infeed conveyor 6 at its feed end is carried or caused to travel to the first drum 4 and gripped to the surface thereof through the belt by suction.

To enable a hide to be transferred from the first to the second drum and in process reverse the face or surface of the hide exposed to treatment, thus enabling the beamhouse operations to be performed as a continuous process, it is necessary to provide transfer means capable of breaking the suction bond to the first drum at the point of convergence of the latter with the second drum. This is accomplished by leading the belt 6 over a roller 7a after it leaves the first drum, the roller being positioned to cause the belt to bear against or engage the second belt 8 and conform to the periphery of the second drum immediately beyond the point of convergence of the two drums. An S or reverse curve is thus imparted to the first belt 6 causing it to travel substantially tangential to the first drum at the point of convergence of the two drums, and by positively breaking the suction bond of the first drum, progressively forcing or transferring a hide therefrom against and into the suction grip of the second drum. As will be observed, a like roller may be positioned in advance of the point of convergence of the two drums for causing the second belt 8 to bear against or engage the first belt 6 and conform to the periphery or circumference of the first drum, the consequent S or ogee curvature of the second belt aiding the suction of the first drum in gripping a hide thereto and channeling the hide between the two belts over the transfer area. A like interruption or breaking of the suction grip of the second drum is provided by leading the encircling or second belt 8 therefrom and causing it to abut against and ride over the inner roller of the outlet conveyor 10 at the point of approach or convergence of this conveyor and the second drum.

As introduced into the apparatus through the infeed conveyor 6 a hide will normally be wet from previous treatments. While by leading the infeed conveyor directly from the roller 7 to the drum 4 a wet hide can be fed up the resultant relatively high slope without slipping, in the illustrated embodiment a guide roller 13 overlies the infeed conveyor 6 in advance of the first drum, the belt thereafter assuming a rather steep upwardly inclined path of travel until it reaches the first drum. To ensure non-slippage of the wet hide in the area of the guide roller 13 and thereafter to the first drum suction may be employed to grip the hide to the conveyor by providing a suction pan 14 underlying the conveyor and having a perforate or foraminous upper wall 15 conforming to this portion of the path of travel of the conveyor. Suction may be applied through the wall 15 by connecting the pan 14 to a suitable vacuum pump, not shown.

It has been found in practice that a hide has a tendency to wrap itself around the guide roller 13 as well as to stick to the infeed conveyor in the vicinity of the guide roller 7a, in both cases interfering with its proper travel through the apparatus. While the rollers may be solid, to overcome the tendency of the hide to stick, each is preferably in the form of a pipe 13a having a line of holes 13b directed toward the hide on which is rotatably mounted a perforate cylinder 13c of brass or the like. With this construction water or other fluid under pressure is applied to the confronting face of the hide and sticking entirely prevented.

Associated with each of the work-supporting drums 4 and 5 are one or more treating devices. As previously mentioned, the apparatus of the present invention is particularly designed to perform upon a hide the so-called "beamhouse" operations. In the illustrated embodiment a hide is subjected to unhairing and scudding while passing over the first drum and fleshing and cheeking in its travel over the second drum, a hide thus being placed on the feed conveyor 6 with its hair side up and preferably with its shank or tail edge leading. As in the case of my aforementioned co-pending application, the several processes or treatments may be performed by either mechanical cutters or fluid jets or a combination of both, the fluid jets when used alone being under sufficiently high pressure to penetrate the surfaces of a hide and remove or expel all undesired material therefrom. However, for purposes of illustration, cutters are here employed as the primary undesired matter-removing means. Accordingly, there are provided for each of the drums 4 and 5 one or more cutters, two being shown for each drum. All of the cutters are preferably bladed cylinders having helical blades opposed at their centers and of decreasing pitch toward either end to cause their cutting to be accompanied by a spreading or setting-out action on the hide. Of the sets of cutters the blades of those associated with the first drum for unhairing and scudding are preferably round-nosed while those of the second drum for fleshing and cheeking may be sharp edged.

Referring now particularly to the cutters associated with the first drum 4, the advance, leading or first cutter 16 and the following or second cutter 17 are positioned in spaced stations along the periphery of the drum with their axes parallel to that of the drum and are suitably journaled in the frame 1. The cutters preferably extend substantially across the work-supporting surface of the drum and are designed to be driven or rotated in opposite directions such that their surfaces adjacent the drum are divergent, thereby applying a stretching force to the hide. For the disclosed clockwise rotation of the first drum, the first and second cutters thus preferably rotate in clockwise and counter-clockwise directions, respectively. Intermediate the two cutters there may be provided a grip roll 18 suitably journaled in the frame 1 and adapted to be rotated or driven counterclockwise such that the confronting surfaces of the roll and drum will move in the same direction. This grip roll is provided with blunt blades of the same helical configuration as those of the cutters, thus enabling it to assist in spreading as well as in gripping and driving the hide between the cutters. Associated with and preferably extending substantially across the face of the first drum are one or more nozzles 19 for directing or impinging fluid jets against and preferably substantially tangential to the surface of a hide. When employed in conjunction with the cutters these jets will function mainly to cool or lubricate the hides during processing and to wash therefrom the matter removed by the cutters. For this purpose the nozzles may be mounted between the cutters 16 and 17 on either side of the grip roll 18 and positioned to direct their jets in divergent directions at the two cutting or working areas.

The cutters for the second drum 5, termed in order of succession the third or leading cutter 20 and the fourth or following cutter 21 are mounted in positions relative to each other and the second drum corresponding to those of the first and second cutters and the first drum and rotate in the same relative directions. Thus, the second drum rotating counter-clockwise, the third and fourth cutters rotate counter-clockwise and clockwise, respectively. In like manner there may be provided for the second drum a grip roll 22 disposed intermediate the two cutters as well as fluid jet applying nozzles 23.

As shown in Figure 1, the several cutters are intended to be movable radially of their associated drums. This may be accomplished by the provision for each end of each of the cutters of a radially movable mounting in the form of a journal housing or block 24 slidably mounted between jaws 25 formed in the upright 2. For moving each housing there is provided a fluid pressure cylinder 26, preferably double-acting, mounted on the upright and connected to the journal housing 24 through a piston rod 27, the journal housing thus being reciprocable radially of the associated drum and its direction of movement depending upon whether fluid pressure is applied to the upper or lower ends of the fluid pressure cylinder 26. By use of fluid pressure the cutters are not only enabled to be reciprocated radially of their associated drums but the force exerted by the cutters upon the hide is resilient or yieldable and can be controlled merely by regulation of the pressure applied to the fluid pressure cylinder 26. If desired, the stroke and thus the distance of travel of the cutters in either direction may be made adjustable through the provision of suitable stops, the illustrated embodiment having such a stop for adjustably limiting the outward movement of the cutters in the form of a nut or collar 28 threadedly encircling each piston rod 27 and adapted to abut the upper end of the jaws 25.

Hides, by their very nature, will vary in thickness both individually and relatively. It is therefore desirable to provide means whereby the treating portion of the apparatus can accommodate itself to irregularities in thickness of both types. This may be accomplished by the provision of resilient or yieldable work-supporting walls on the drums 4 and 5. For this purpose the walls 11 are preferably multi-layered, having an inner or backing layer 11a of metal, an intermediate relatively soft layer 11b of rubber or like material, and an outside relatively thin layer 11c of tough wear-resistant rubber or like material, the whole being bonded by vulcanizing or like means. So formed, irregularities in thickness of an individual hide will depress the middle layer correspondingly, thus presenting to the cutters a flat surface, the yieldable mounting of the cutters in turn accommodating variations in thickness between different hides. Since the belts 6 and 8 are interposed between the outer surfaces of the drums and the cutters it is preferable that they also possess resiliency or at least be enabled to conform to impressed variations in contour of the surfaces of the drums. While belts of canvas or the like are satisfactory for this purpose, rubber belts have been found particularly suitable. Subjected to the same variations as the cutters, the grip rolls 18 and 22 should also be resiliently mounted. This may be obtained by provision for the grip rolls of fluid pressure mountings similar to those previously described in connection with the cutters.

Figure 15:
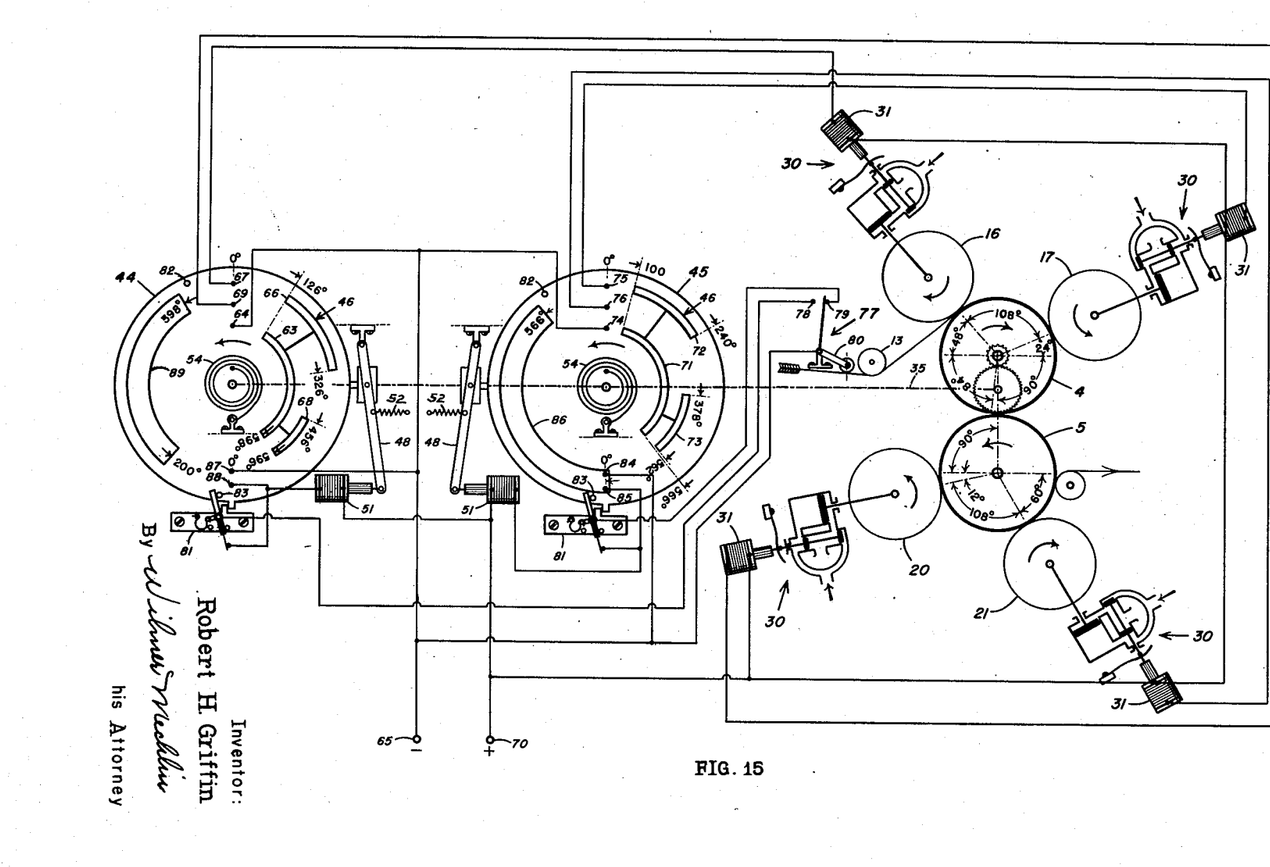
Figure 15 is a diagrammatic view illustrating the electrical and fluid pressure circuits by which the apparatus is automatically controlled by the cycle motor, the motor being shown on a relatively larger scale.

Considering now Figures 8 through 15, Figures 8 through 14 illustrate the structural details of a cycle motor and Figure 15, the manner in which the motor controls the operation of the hide treating apparatus. The purpose of cyclically controlling the operation of the several treating devices is to coordinate their action and enable each of the cutters associated with each of the drums to work upon roughly one-half of the exposed or presented surface of each hide introduced into the apparatus. Since the cutters of each drum are positioned at spaced stations, the stations being preferably spaced apart less than one-half the length of a minimum hide, the leading and following cutters, without controls, would in each case act upon the entire surface of a hide rendering the action of the other cutter repetitious. It is therefore intended that the first and third cutters, 16 and 20, the leading cutters on the first and second drums, respectively, be inactivated during the passage of the leading portion of a hide through their stations and rendered active in time to operate upon the trailing portion of the hide. To eliminate repetition of treatment of the trailing portion of the hide it is also necessary that the following cutters on each drum, termed the second and fourth cutters, 17 and 21, respectively, be inactivated during passage of the trailing portion of a hide past their stations. Additionally, in order that the apparatus may be capable of handling hides in rapid succession, the control of the activation and inactivation of the several cutters must be such that each hide is treated uniformly. The illustrated cycle motor or cyclic control, designated generally as 29, is designed to fulfill these requirements.

As previously mentioned, the journals 25 housing the ends of the shafts of the cutters are reciprocable radially of their associated drums through fluid pressure cylinders 26 to the piston rods 27 of which they are directly connected. For determining the direction of movement of the cutters there is provided for each of the fluid pressure cylinders a solenoid-operated control valve 30. The solenoids 31 of these valves are in turn energized through electrical circuits controlled by the cycle motor 29.

The details of the cycle motor 29 appear in Figures 8 through 14. As there shown, the cycle motor 29 is mounted on a suitable base 32 which may form part of a case 33. Adjacent opposite ends of the base 32 are mounted uprights, stanchions or supports 34 in which a main shaft 35 is journaled. This shaft 35 is connected to and rotated through the shaft or axle 36 of the first drum 4 by reduction gearing 37, the ratio of which in the illustrated embodiment is 1:4. On this main shaft 35 are mounted the controlling elements for determining the movements of the several cutters, one group of elements being provided for the leading cutters, the first and third, 16 and 20, and another group for the following cutters, the second and fourth, 17 and 21. As shown, these groups are spaced along the main shaft 35 sufficiently to avoid interference and each may comprise a clutch plate 42 keyed to the shaft. Confronting each of the clutch plates and slidably mounted on the shaft is a collar 43, to each of which is affixed a circular disc, that for the leading cutters termed the leading edge or leading cutter control disc, being designated as 44 and that for the trailing cutters, the trailing edge or trailing cutter control disc 45. These discs are formed of non-conducting or insulating material and carry on or have inset in or impressed on their clutch plate-confronting faces a plurality of arcuate conducting tracks or commutator strips 46 of the character and for the purpose to be hereinafter explained.

Associated with each of the collars 43 and connected thereto through groove and set screw or like means 47, enabling the collar to rotate relative thereto, is a yoke or throated lever 48, having one end pivoted or hinged to a suitable fixed support 49 and the other end connected to a reciprocable core 50 of a solenoid 51. The pivot and solenoid are so positioned relative to each of the keyed clutch plates 42 that each of the collars 43 is brought into engagement with its associated clutch plate 42 on energization of the related solenoid. For normally maintaining the collars and clutch plates in spaced or disengaged relation there may be provided a spring or like means 52 opposing the force of the solenoid and a suitable stop 53, preferably adjustable, for limiting the extent of such movement.

With the above arrangement energization of one of the solenoids 51 will cause the associated collar 43 to be moved into engagement with its clutch plate 42. The clutch plate, keyed to the main shaft 35, which in turn is connected through reduction gearing 37 to the first drum 4 and rotated thereby, will carry or cause the corresponding disc 44 or 45 to rotate with it so long as the associated solenoid is energized. To return the discs 44 and 45 to their initial or starting positions on de-energization of the associated solenoids there is provided for each a coil spring or other torsion means 54. Utilizing the disclosed coil spring 54, one end is attached to the collar 43 and the other fixed to a stationary support 55, the coil being wound in the direction of rotation of the main shaft 35. For fixing the initial positon of the discs 44 and 45 there may be provided stop means in the form of a lug 56 on each of the discs which is adapted to abut against a stop bracket 57 mounted on the base 32.

Figure 8:
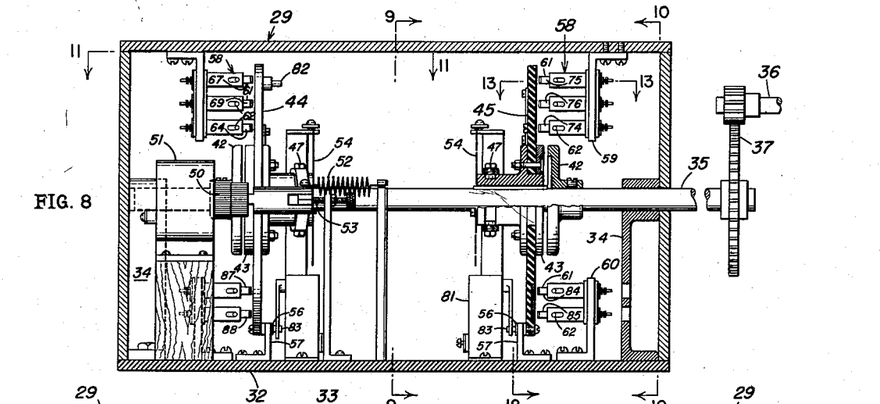
Figure 8 is a side elevational view with portions broken away, of the cycle motor by which the operation of the apparatus of Figure 1 is automatically controlled.
Figure 9:
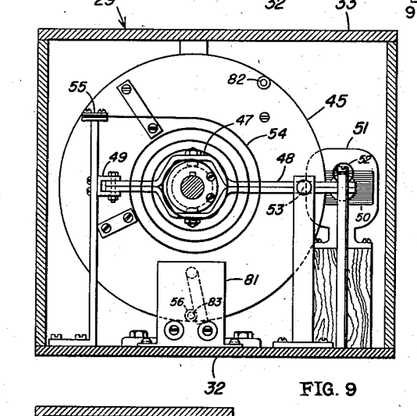
Figure 9 is a vertical sectional view taken along the lines 9—9 of Figure 8.
Figure 10:
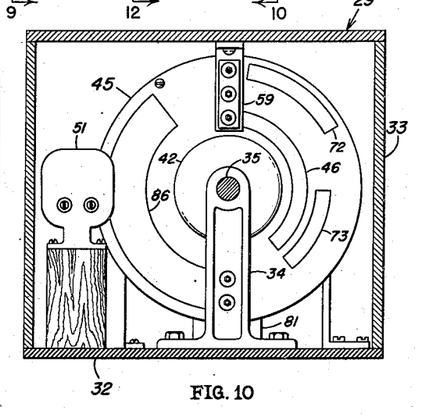
Figure 10 is a vertical sectional view taken along the lines 10—10 of Figure 8.
Figures 11, 12:
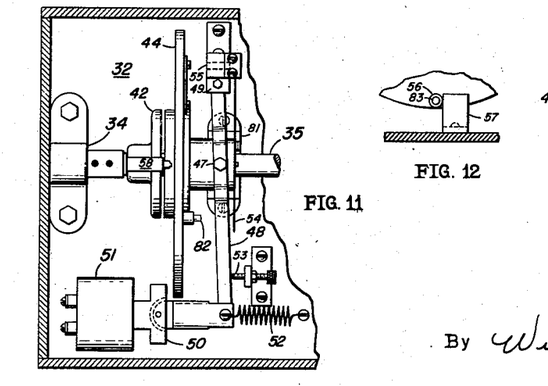
Figure 11 is a plan view taken along the lines 11—11 of Figure 8 with the top of the case removed to more clearly illustrate certain details of construction.
Figure 12 is a fragmentary vertical sectional view taken along the lines 12—12 of Figure 8.
Figures 13, 14:
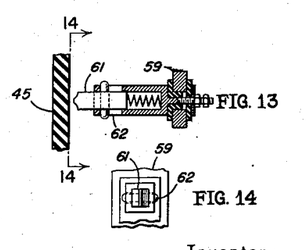
Figure 13 is a horizontal sectional view on an enlarged scale taken along the lines 13—13 of Figure 8.
Figure 14 is a fragmentary end elevational view taken along the lines 14—14 of Figure 13.

From Figure 8 is will be noted that associated with and confronting the track-carrying faces of each of the discs 44 and 45 are a plurality of contact brushes or members 58, the five illustrated being arranged in an upper group of three and a lower group of two, each carried by suitable brackets 59 and 60, respectively, mounted on the casing 33. Each of these brushes overlies one of the several contact tracks, strips or plates 46, being normally spaced therefrom when the collars 43 and clutch plates 42 are separated, and adapted to make contact therewith after the associated solenoids 51 have been energized. While both tracks and brushes may be made of copper or other suitable conducting material, the brushes shown have resiliently and insulatedly mounted electrodes 61 of carbon or the like, the outward movement of each of which relative to its mounting may be limited by means such as the illustrated pin and slot connection 62.

On examining Figure 15, the purposes of the several features of the cycle motor 29, hereinbefore described, will become apparent. As there shown, each of the discs is divided vertically into two semi-circular sectors, that on the right-hand side containing three tracks, each disposed in the path of one of the three brushes of the upper group. Referring first to the wiring connections of the tracks of the right-hand sector of the left-hand, leading cutter control or leading edge disc 44 and their associated or cooperating brushes, it will be found that they are designed to control the operation of the two leading cutters 16 and 20. For this purpose the inner track 63 serves as a ground, it, consequently, including the limits of and being electrically connected to each of the other tracks. This inner track is disposed in the path of and adapted to contact the lowermost brush 64, the latter being connected to a main ground or negative lead 65 of a battery or other source of electrical energy, not shown. Of the other two tracks, the outermost or leading track 66 is adapted to contact the uppermost brush 67 which is connected in the circuit of the actuating fluid pressure control valve 30 of the first cutter 16. The third, following or intermediate track 68 is in turn adapted to contact the intermediate brush 69 in the circuit of the solenoid 31 of the control valve for the third cutter 20. Since both of the actuating solenoids 31 are connected to the positive lead 70 of the energy source, the tracks and their associated brushes are adapted to close the circuits of and energize the cutter solenoids 31 and thus cause actuation of the cutter control valve and, through fluid pressure, the reciprocable movement of the leading cutters.

Considering now the right-hand or cutter-controlling sector of the right-hand or trailing cutter control disc 45, it also is provided with three tracks, an inner track 71 serving as a ground, and leading and trailing outer tracks 72 and 73, respectively. These tracks are arranged and connected in the same manner as those of the leading cutter control disc and are adapted to operate the trailing or second and fourth cutters 17 and 21 by energization of the associated actuating solenoids, the brushes corresponding to the ground and second and fourth cutter-controlling tracks, through which the connections are made, being numbered, respectively, 74, 75 and 76.

Having provided separate control of the leading and trailing cutters, the former by the left-hand or leading cutter control disc 44 and the latter by the right-hand or following cutter control disc 45, it is contemplated to activate the left-hand disc by the leading edge of a hide and the right-hand disc by the trailing edge of the same hide, thus to coordinate the operation of the several cutters with the passage of each hide and render the apparatus fully automatic. To this end there may be provided a two-way switch 77, connected at one end to the positive main terminal 70 and having alternate poles 78 and 79, each connected to the negative main terminal 65, the pole 78 through the actuating solenoid of the leading cutter control disc and the pole 79 through the solenoid of the trailing cutter control disc. To adapt it alternately to close one of the solenoid circuits under actuation of a hide, the control switch, preferably a micro-switch, has a roller or like actuating arm 80 disposed in the path of travel of the hide as indicated by the large arrow in Figure 15. The switch is preferably positioned in advance of the first cutter with its actuating arm normally resting on or engaging the feed belt 6 and adapted to be raised or lifted therefrom during passage of a hide under its station.

Through the actuating arm 80 the control switch 77 is caused to close the circuits of the solenoids of the leading and following cutter control discs when the arm is in its up or tripped and down or untripped positions, respectively, through their related poles 78 and 79. Thus the leading cutter control or leading edge disc is activated by the control switch as the actuating arm is raised by a hide and the trailing cutter control or trailing edge disc activated on return of the arm to normal position. Activation of the leading and trailing edge discs is thereby made responsive, respectively, to passage of the leading and trailing edges of the hide under the control switch.

As previously pointed out, each of the cutter control discs begins to rotate on energization of its associated solenoid and continues to rotate until its solenoid circuit is interrupted. On the other hand the illustrated cycle control is dependent upon return of each of the discs to normal or zero position on completion of its cycle by reversal of its direction of rotation. Thus, if the solenoid circuits were interruptable only by shift of the control switch 77 and the latter remained in one of its positions for a prolonged period, the affected disc would continue to rotate beyond its cycle and disrupt automatic control of the apparatus. Such an eventuality is particularly likely in the case of the trailing edge disc since its solenoid circuit is normally closed and interrupted only when a hide is fed into the machine. It is therefore necessary to provide means for limiting the rotation of the trailing edge disc to its operating cycle, regardless of the position of the control switch. While not essential, rotation limiting means are also desirable for the leading edge disc to guard against prolonged holding open of the control switch by sticking or other cause. In either case, this may be accomplished by use of a mechanical limit switch 81 wired in series with the control switch. Each of these limit switches may be in the form of a snap switch mounted adjacent the periphery of the associated disc and positioned to be tripped or opened by a limit pin 82 carried by the disc. This pin must, of course, be positioned beyond the initial position of the switch an angular distance at least equal to that travelled by the right-hand sector of the disc in completing the operation cycle of the associated cutters. As the switch must be closed to enable the related solenoid to be energized at the start of each cycle, the limit switch may be reset or closed as the disc returns to zero or starting position by a setting pin 83 also carried by the disc.

While the several cutters may normally be in either operative or inoperative position and may be caused to rotate either at all times or only when in contact with a hide, it is preferred that both drums and the several associated rotating members rotate at the desired speeds at all times during operation of the apparatus and that the cutters normally be in down, hide treating or operative position. Accordingly, the illustrated cutter-controlling fluid pressure valves 30 will normally apply hold-down pressure to the cutters and only cause the latter to be withdrawn to inoperative position when their associated actuating solenoids are energized. Under these conditions the operation cycle set up by the cycle motor 29 is in general as follows. The leading or first and third cutters, 16 and 20, are withdrawn to inoperative position in advance of the arrival of the leading edge of a hide, the following or second and fourth cutters 17 and 21 then remaining in operative position. After the following cutters have acted upon the leading portion of the hide, the leading cutters are returned to operative position and act upon the trailing portion of the hide. For a short period both leading and trailing cutters act concurrently upon the hide, this portion of the cycle enabling the apparatus to handle skins of varying length. Finally, the trailing cutters are withdrawn to inoperative position until the trailing edge of the hide has passed their stations, thus avoiding repetition of treatment as well as preventing scooping or picking up of the trailing edge.

To aid in understanding the automatic control of the apparatus of the present invention a typical operating cycle for a particular arrangement of operative members is shown in Figure 15, certain angular distances or arcs there being indicated on both the work-supporting drums 4 and 5 and the control discs 44 and 45. Of the several indicated arcs on the drums the first on the first drum, reading clockwise, beginning with its third or lower left hand quadrant, indicates the angular lead between the point of contact of the control switch 77 and a horizontal radius dividing the third and fourth quadrants of the drum. The remaining arcs on both drums represent distances between the cutter stations and the relationships of these stations to horizontal and vertical radii. Geared 1:4 with the drums, one-half of each of the control discs of course is enabled to govern and control the entire path of travel of a hide through the apparatus. On both control discs the zero angle or position is fixed by the position of the control switch 77 relative to the several cutters, the remaining arcs or angles on the leading and trailing edge discs referring, respectively, to angular distances of travel of the leading and trailing edges of a hide through the apparatus beyond the switch.

With the several members in their designated relative positions, the typical operating cycle proceeds in the following manner. Tripped by the leading edge of the hide the switch 77 energizes the solenoid 51 actuating the leading cutter control disc 44, causing the disc to begin rotating. As the leading edge of the hide approaches the station of the first cutter, at a position angularly 126° beyond the control switch, contact is made between the brush 67 and track 66 energizing the solenoid of the control valve of the first cutter 16 and by admission of fluid pressure, causing the first cutter to move to inoperative position. 200° later, just prior to the transfer of the leading edge of the hide to the second drum, the brush runs off its track, returning the first cutter to operative position. 130° further, as the leading edge of the opposite side of the hide approaches the station of the third cutter, contact is made by the brushes 69 with the intermediate track 68, withdrawing the third cutter to inoperative position. After the leading edge of the hide has reached and treatment of it has been begun by the fourth cutter, the third cutter is returned to operative position, this occurring 140° later as the brush 69 runs off its track. 2° later the circuit of the solenoid 51 is broken by tripping of the limit switch 81 by the limit pin 82 unless previously broken by untripping of the switch 77. As the trailing edge of the hide passes under the control switch, the solenoid 51 of the first disc is de-energized, causing the disc to be disengaged from its clutch plate 42 and returned to starting position by the torsion spring 54.

As previously mentioned, untripping of the switch 77 immediately closes the circuit to the solenoid actuating the trailing cutter control disc 45, causing the disc to begin to rotate. Some 100° thereafter the outer track 72 makes contact with the brush 75 connected to the solenoid-actuated valve for the second cutter and withdrawing the cutter to inoperative position. 240° thereafter, subsequent to the passage of the trailing edge of the hide under its station, the second cutter is returned to operative position. After the trailing edge of the hide has covered an additional 138° and begun its transfer to the second drum 5 contact is made by the brush 76 with the intermediate track 73 and the fourth cutter caused to be withdrawn to inoperative position where it remains for 184° by which time the trailing edge of the hide has passed its station. Almost at the same time, or 4° later, the associated limit switch 81 is tripped by its limit pin 82, breaking the circuit of the associated lever-actuating solenoid 51 and by de-energizing the latter, enabling the associated torsion spring 54 to return the disc to starting position.

While heretofore described with relation to a single hide, the disclosed arrangement of controls is enabled to treat a rapid succession of hides with equal effectiveness, the cycle motor causing the apparatus to perform the same cycle of operations on each successive hide. As previously mentioned, untripping of the control switch 77 by de-energizing its actuating solenoid 51 causes the leading cutter control disc 44 to return to starting position, ready to begin its cycle anew. Thus it is only necessary to space the leading edge of a succeeding skin from the trailing edge of its predecessor a sufficient distance to encompass the interval of return to starting position of the first disc 44 for the cycle to be repeated. In practice, a spacing of as little as two inches has been found adequate for average skins. However, it will immediately become apparent that retripping of the switch 77 will interrupt the circuit to the actuating solenoid 51 of the second disc 45, causing the latter to return to starting position and disrupting the operating cycle of the trailing or second and fourth cutters 17 and 21.

To avoid this contingency and ensure that the trailing edge disc will each time run its full cycle provision is made for by-passing the control switch after the cycle has been initiated. This is accomplished in the disclosed embodiment through use of the previously mentioned pair of brushes of the lower group, and now designated as 84 and 85, respectively. The brushes are wired in series with the associated disc-actuating solenoid 51 and connected across the main terminals 65 and 70, by-passing the control switch. For making contact between the brushes and thus completing this secondary solenoid energizing circuit there is mounted on the left-hand sector of the disc a conducting track 86 the arc or angular extent of which from zero position is equal to the angular distance travelled by the right-hand sector over the full operating cycle of the associated cutters. Normally spaced from the track, in the manner previously mentioned, the brushes engage the track and make contact thereacross immediately on energization of the actuating solenoid through the control switch and thereafter provide a closed circuit for energizing the solenoid until the following cutter cycle has been completed.

With provision made for locking-in the trailing edge disc 45, once its cycle has been initiated by actuation of the control switch 77, the apparatus will automatically handle any hide having sufficient length to permit the leading edge disc 44 to complete its cycle before the control switch is released by the trailing edge of the hide. For 8" diameter work-supporting drums, which have been found particularly effective in treating hides of the smaller type, and the relative dispositions of the control switch and leading cutters employed in the illustrated embodiment, this critical length is slightly less than 42". This length, of course, can be decreased by shifting the position of the control switch closer to that of the first cutter. However, the apparatus is not so limited and may be made to accommodate hides of less than critical length and to treat all hides with uniform effectiveness, by providing means for locking the leading edge disc in its cycle. This may be accomplished in the same manner as was the locking-in of the trailing edge disc, by by-passing the control switch and energizing the solenoid through a secondary circuit containing the brushes 87 and 88 of the lower group and a contact track 89 carried by the disc, once the cycle has been initiated by the control switch. It will be seen that in the illustrated embodiment there has been provided a gap of some 200° between the initial position of the brushes and the start of the contact strip. This is desirable to enable the cycle of the apparatus to be interrupted at any time before the leading edge of a hide reaches the station of the first cutter, should any part of the apparatus appear to be functioning improperly.

Using the above described automatic cyclic control, the hide treating apparatus of the present invention has proved capable not only of handling a plurality of hides introduced in rapid succession, but of successfully performing its treatments upon hides varying widely in length. Thus, while hides of the smaller type for which the illustrated apparatus is particularly designed will average about four feet in length, with 8" diameter drums, hides running from 5' down to somewhat over 3 feet can be handled uniformly. Through use of the hereinbefore described locking-in of the leading edge disc, this lower limit can be carried down to any conceivable minimum, requiring only a relatively greater spacing between the hides as fed into the apparatus. Equal or greater latitude can, of course, be obtained in treating larger skins by correspondingly varying the size and disposition of the several operating parts.

One further feature of the invention merits discussion. It has been previously stated that sprays are employed to wash from the surfaces of a hide the undesired matter removed therefrom by the several cutters. In process, the sprays will usually drive some of the waste matter onto the perforate belts encircling the first and second drums. Since there exposed to suction this matter would tend to clog the pores of both belts and drums. It is therefore desirable to provide for flushing of both belts and drums either intermittently or constantly during operation of the apparatus. For the drums this may be accomplished by fixedly mounting within each an axially extending pipe 90 along one side of which is positioned a series of nozzles 91 directed against the inner surface of the supporting wall of the drum within the arc not covered by the associated encircling belt. To prevent reduction by the internal jets in the suction applied to the outer surface of the drum, the jets are preferably contained or encompassed within a sealed passage 92 extending between the central pipe and the inner surface of the drum. For the belts it is merely necessary to provide fluid jets 93 positioned to flush their pores during their return or inactive travel. All jets may be provided with appropriately positioned sumps 94 to drain off excess moisture.

From the above detailed description it will be apparent that there has been provided an improved apparatus for treating sheet material which, while particularly adapted for handling hides or other material requiring treatment on both sides, may be utilized for sheet material in general. It should be understood that the described and disclosed embodiment is merely exemplary of the invention and that all modifications are intended to be included which do not depart either from the spirit of the invention or the scope of the appended claims.

Having described my invention, I claim:

1. Apparatus for treating hides comprising a movable work support, means associated with said support for treating a hide, and means actuated by means positioned in advance of said treating means for causing said treating means to treat said hide in direct correlation with any speed of travel of said hide past said treating means.

2. Apparatus for treating hides comprising a work support, means associated with said support for treating a hide, and means acting dependently of said support in response to movement of said hide past a reference point for cyclically controlling operation of said treating means in timed relation to movement of said hide relative to said treating means.

3. Apparatus for treating sheet material comprising a movable work-support, a plurality of treating devices stationed at spaced intervals along the path of travel of said support, and control means responsive to travel of said material past a reference point for cyclically controlling the operations of said plurality of treating devices in direct correlation with any speed of travel of said material over said path past said treating devices.

4. Apparatus for treating hides comprising a supporting drum, a treating device stationed peripherally of said drum, and means positioned in advance of said treating device and actuated by said hide for causing cyclic control of the operation of said device dependently of movement of said drum.

5. Apparatus for treating hides comprising a plurality of work-supporting drums arranged to receive and support a hide in sequence, an endless conveyor encircling the first of said drums and driven thereby for introducing a hide thereto, and an endless conveyor encircling certain of said successive drums, each of said conveyors diverging from its associated drum adjacent a point of transfer therefrom and overlying a conveyor of a succeeding drum for transferring said hide to said succeeding drum.

6. Apparatus for treating hides comprising a plurality of rotary supports arranged to receive and support a hide in sequence, suction means for gripping said hide to each of said supports, and means exterior of said supports and movable therewith for transferring a hide to the succeeding of said supports.

7. Apparatus for treating hides comprising a plurality of movable supports arranged to receive and support a hide in sequence, means associated with said supports for treating said hide, suction means for gripping said hide to each of said supports, means exterior of each of said supports and movable therewith for transferring said hide to the next succeeding support, and means for cyclically controlling operation of said treating means in timed relation to the travel of said hide through said apparatus.

8. Apparatus for treating hides comprising a plurality of rotatable drums arranged to receive and support a hide in sequence, means associated with each of said drums for treating said hide, suction means for gripping said hide to each of said drums, means movable with each of said drums and diverging therefrom adjacent a point of transfer therefrom for transferring said hide to said succeeding drum, and means actuated by said hide for cyclically controlling said treating means in timed relation to the travel of said hide through said apparatus.

9. Apparatus for treating hides comprising a plurality of rotatable drums arranged to receive and support a hide in sequence, suction means for gripping said hide to each of said drums and exposing an entire surface thereof during travel thereon, means associated with each of said drums for removing excess material from the exposed surface of said hide, and hide-carrying means movable with each of said drums and diverging therefrom adjacent a point of transfer therefrom for transferring said hide to the next succeeding drum and reversing the surface of said hide exposed to treatment.

10. Apparatus for treating hides comprising a plurality of rotatable drums arranged to receive and support a hide in sequence, means for gripping said hide to each of said drums and exposing an entire surface thereof during travel thereon, means associated with each of said drums for removing excess material from the exposed surface of said hide, means movable with each of said drums and diverging therefrom adjacent a point of transfer therefrom for transferring said hide to the next succeeding drum and reversing the surface of said hide exposed to treatment, and means actuated by said hide for cyclically controlling operation of said excess material-removing means in timed relation to the travel of said hide through said apparatus.

11. Apparatus for treating hides comprising a rotary work support, hide treating means reciprocable relative to said support to treating and non-treating positions, and means driven at a fixed ratio relative to the rotation of said support for cyclically controlling reciprocation of said treating means and thereby treatment of said hide in direct correlation with the travel of said hide past said treating means.

12. Apparatus for treating hides comprising a rotary hide-supporting drum, a cutter for removing excess material from a hide, said cutter being reciprocable substantially radially of said drum into hide-engaging and disengaging positions, and means actuated by said hide and synchronized in movement with rotation of said drum for cyclically controlling reciprocation of said cutter and thereby removal of excess material from said hide in direct correlation with travel of said hide past said cutter.

13. Apparatus for treating hides comprising a rotary hide-supporting drum, leading and following cutters positioned in spaced stations around said drum and reciprocable substantially radially thereof into operative and inoperative positions, means acting dependently of said drum for cyclically controlling reciprocation of each of said cutters, and means for activating said cyclic control for said leading and following cutters responsive to passage of leading and trailing edges of said hide over said drum.

14. Apparatus for treating hides comprising a plurality of rotary drums arranged to receive and support a hide in sequence, leading and following cutters associated with and positioned in spaced stations around each of said drums, said cutters being reciprocable substantially radially thereof into operative and inoperative positions, means for cyclically controlling reciprocation of said leading and following cutters, and means for activating said cyclic control means for said leading and following cutters responsive to passage of leading and trailing edges of said hide through said apparatus.

15. Apparatus for treating hides comprising a plurality of rotary drums arranged to receive and support a hide in sequence, leading and following cutters associated with and positioned in spaced stations around each of said drums, said cutters being reciprocable substantially radially thereof into operative and inoperative positions, means for cyclically controlling reciprocation of said leading and said following cutters, and means actuated by said hide for activating said cyclic control means for said leading and following cutters responsive to and in timed relation with the passage of leading and trailing edges of said hide through said apparatus.

16. Apparatus for treating hides comprising a movable work support, a plurality of hide treating devices positioned in spaced stations along said support, and means movable dependently of said support and actuated by a hide in advance of said treating means for causing said treating means to operate in timed relation to the passage of said hide past said treating means.

17. Apparatus for treating hides comprising a plurality of work-supporting drums arranged in sequence, means associated with each of said drums for treating a hide, means for gripping said hide to the exterior of each of said drums, said means being adapted to present an entire surface of said hide to the associated treating means, and means for transferring said hide from one to the next of said drums.

18. Apparatus for treating hides comprising a plurality of movable work supports, means for gripping the inner face of a hide on the surface of each of said supports and exposing the entire outer face of said hide, means for transferring said hide in sequence from one to the next of said supports, and means associated with said supports for treating said hide during its travel through said apparatus.

19. Apparatus for treating hides comprising a plurality of hide-supporting drums arranged to receive and support a hide on their surfaces in sequence, means associated with said drums for treating said hide, means for gripping said hide to each of said drums in treating means confronting position, and means for transferring said hide from the surface of one drum to that of the next succeeding drum regardless of the portion of the surface of the first drum occupied by said hide.

20. Apparatus for treating hides comprising a plurality of work-supporting drums arranged in sequence, means associated with each of said drums for treating a face of said hide, means associated with each of said drums for uniformly gripping the entire hide to the surface of said drums, and means for transferring said hide from one drum to the next succeeding drum.

21. Apparatus for treating sheet material comprising a plurality of rotatable drums arranged to receive and support said material in sequence, and an endless conveyor encircling each of said drums, each of said conveyors diverging from its associated drum adjacent a point of transfer therefrom and confronting and overlying a succeeding conveyor for transferring said material to said succeeding conveyor and supporting said material thereon between said drums.

22. Apparatus for treating hides comprising a plurality of conveyors arranged to receive and support a hide in sequence, each of said conveyors encircling a rotary member and diverging therefrom at a predetermined point and each of certain of said conveyors adjacent said point of divergence confronting and overlying a succeeding conveyor for transferring said hide to said succeeding conveyor and supporting said hide thereon.

23. Apparatus for treating sheet material comprising a plurality of movable work supports arranged to receive and support said material in sequence, a plurality of treating devices associated with each of said supports and arranged in spaced stations therealong, and means disposed in advance of said devices and actuated by said material for causing cyclic operation of said devices in timed relation to the travel of said material past said stations.

24. Apparatus for treating hides comprising treating means, means for presenting a hide to said treating means and causing relative travel therebetween, means for cyclically controlling operation of said treating means including means movable at a given ratio relative to said travel regardless of the speed thereof, means responsive to movement of said movable means and having a selected disposition relative thereto for causing operation of said treating means in a cycle predetermined by said disposition of said responsive means, and means actuated by said travel for controlling movement of said movable means.

25. Apparatus for treating hides comprising treating means, means for presenting a hide to said treating means and causing relative travel therebetween, means for cyclically controlling operation of said treating means including means drivable with and at a predetermined ratio relative to said travel, means impressed on said movable means, means having a selected disposition relative to said impressed means and responsive thereto on movement of said movable means for causing a cycle of operation of said treating means predetermined by said disposition, and means actuated by said travel for controlling movement of said movable means.

26. Apparatus for treating hides comprising a movable work support, means associated with said support for treating a hide supported thereby, means movable in synchronism with travel of said hide, means carried by said movable means and movable therewith, means having a preselected disposition relative to said carried means and responsive to movement thereof for causing cyclic operation of said treating devices determined by said disposition, and means actuated by said hide for controlling movement of said movable means.

27. Apparatus for treating hides comprising a movable work support, a plurality of devices associated with said support and positioned in spaced stations therealong for treating a hide carried by said support, means movable in a given ratio relative to travel of said hide, means impressed on said movable means and movable therewith, contact means associated with each of said treating devices and each having a selected disposition relative to said impressed means, said contact means being responsive to movement of said impressed means for causing cyclic operation of the associated treating device determined by said disposition, and means actuated by leading and trailing edges of a hide for controlling movement of said movable means.

28. Apparatus for treating hides comprising a movable work support, a plurality of devices positioned in spaced stations along said support for treating a hide, means for initiating operation of said devices in predetermined cycles, said initiation being responsive for certain of said devices to passage of a leading edge of said hide and for other of said devices to passage of a trailing edge of said hide, and means for interrupting and reinitiating said cyclic operation of said certain devices responsive to passage of a leading edge of a succeeding hide.

29. Apparatus for treating sheet material comprising relatively movable work supporting and treating means, and control means having means operable at a predetermined ratio relative to the relative movement of said work supporting and treating means for causing said treating means to treat work at a rate variable with said relative movement.

30. Apparatus for treating hides comprising relatively movable work supporting and treating means, and control means responsive to relative movement of work on said supporting means and a reference point for causing said treating means cyclically to treat said work at a rate variable at a predetermined ratio with relative movement of said work and supporting means.

31. Apparatus for treating hides comprising a movable work support, means associated with said support for treating a hide, and control means drivably connected to said support for causing said treating means to treat said hide in correlation with travel of said hide therepast.

32. Apparatus for treating hides comprising a movable work support, means associated with said support for treating a hide, and control means drivably connected to said support and responsive to movement of said hide past a reference point for cyclically controlling treatment of said hide by said treating means in correlation with travel of said hide therepast.

33. Apparatus for treating hides comprising a movable work support, means associated with said support for treating a hide, and control means responsive to travel of said hide past a reference point for causing said treating means to treat said hide in a cycle varying at a predetermined ratio relative to the speed of travel of said hide therepast.

34. Apparatus for treating hides comprising a movable work support, means associated with said support for treating a hide, and control means actuated by said hide for cyclically controlling the treatment of said hide by said treating means dependently of movement of said support.

35. Apparatus for treating hides comprising a plurality of movable work supports, means for gripping a hide to said support and presenting a face thereof for treatment, means associated with said support for treating said hide, and control means actuated by said hide and acting dependently of said support for causing said treating means to treat said hide in correspondence with movement of said hide therepast.

ROBERT HAMILTON GRIFFIN.

References Cited in the file of this patent

UNITED STATES PATENTS

| Number | Name | Date |
|---|---|---|
| 497,941 | Baker | May 23, 1893 |
| 769,017 | Perkins | Aug. 30, 1904 |
| 1,701,226 | Collins | Feb. 5, 1929 |
| 1,718,573 | Millspaugh | June 25, 1929 |
| 1,767,889 | Jurgensen | June 24, 1930 |
| 1,860,713 | Jones | May 31, 1932 |
| 2,204,426 | Millspaugh | June 11, 1940 |
| 2,356,855 | Knowlton | Aug. 29, 1944 |
| 2,374,846 | Thresh | May 1, 1945 |

FOREIGN PATENTS

| Number | Country | Date |
|---|---|---|
| 255,963 | Italy | Nov. 29, 1927 |